United States Patent
Marupaduga (10) Patent No.: US 9,544,807 B1
(45) Date of Patent: Jan. 10, 2017

(54) METHODS AND SYSTEMS FOR VARYING RATE OF TRANSMITTING SEQUENCES OF MASTER INFORMATION BLOCKS BASED ON WIRELESS NETWORK CONDITIONS

(71) Applicant: Sprint Spectrum L.P., Overland Park, KS (US)

(72) Inventor: Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 162 days.

(21) Appl. No.: 14/086,937

(22) Filed: Nov. 21, 2013

(51) Int. Cl.
*H04W 28/02* (2009.01)
(52) U.S. Cl.
CPC ................ *H04W 28/0231* (2013.01)
(58) Field of Classification Search
CPC .... H04W 47/00; H04W 28/0231; H04L 47/00
See application file for complete search history.

(56) References Cited

U.S. PATENT DOCUMENTS

| | | | |
|---|---|---|---|
| 5,638,412 A | 6/1997 | Blakeney, II et al. | |
| 7,227,854 B2 | 6/2007 | Kim et al. | |
| 7,876,867 B2 | 1/2011 | Filipovic et al. | |
| 7,991,421 B2 | 8/2011 | Gandhi et al. | |
| 8,279,799 B1 | 10/2012 | Sarkar et al. | |
| 2007/0275729 A1* | 11/2007 | Kashima | H04W 16/02 455/453 |
| 2008/0039045 A1* | 2/2008 | Filipovic | H04B 1/109 455/295 |

(Continued)

FOREIGN PATENT DOCUMENTS

| | | |
|---|---|---|
| WO | 2008/021815 A1 | 2/2008 |
| WO | 2013/070137 A1 | 5/2013 |
| WO | 2013/138997 A1 | 9/2013 |

OTHER PUBLICATIONS

Rohde & Schwarz, Intermodulation Distortion Measurements, downloaded from the World Wide Web at http://www.tpub.com/neets/book21/89b.htm on Oct. 23, 2013, 1 page.

(Continued)

*Primary Examiner* — Andrew Lai
*Assistant Examiner* — Sumitra Ganguly (57) ABSTRACT

Method and systems for selecting transmission rates for overhead communications within an RF network are described. The overhead communications can comprise network-access overhead communications, such as master information blocks in accordance with an LTE standard or access parameters messages in accordance with a CDMA standard. Selection of the transmission rate(s) can be based on conditions of a wireless network in which a network node and user equipment (UE) devices operate. A network node can determine the wireless network condition. A UE device can transmit measurement data to the network node for determining the wireless network condition. The network node can transmit, at a first rate, a first sequence of the overhead communications, such as one more overhead messages, detect the wireless network condition, select a second rate based on the detected network condition, and then transmit, at the second rate, a second sequence of the overhead communications.

20 Claims, 5 Drawing Sheets

(56) References Cited

U.S. PATENT DOCUMENTS

| | | | |
|---|---|---|---|
| 2008/0102896 A1 | 5/2008 | Wang et al. | |
| 2010/0034093 A1* | 2/2010 | Roh | H04B 7/0417 370/241 |
| 2011/0199946 A1* | 8/2011 | Breit | H04B 7/0626 370/310 |
| 2012/0250699 A1* | 10/2012 | Hou | H04W 48/12 370/441 |
| 2012/0327785 A1 | 12/2012 | Zhang et al. | |

OTHER PUBLICATIONS

Agilent Technologies, 3GPP Long Term Evolution: System Overview, Product Development, and Test Challenges, Application Note, 92 pages on.

Watanabe, Hiroaki; et al.; Evolved Node B on LTE System for NTT DOCOMO, Fujitsu Sci. Tech. J., vol. 48, No. 1, pp. 21-26, Jan. 2012.

Rackspace; Quick Reference—UMTS, downloaded from the World Wide Web at http://www.sharetechnote.com/html/Handbook_UMTS.html on Nov. 15, 2013, 20 pages.

Sai Emerging Wireless Technologies, LTE eNodeB, downloaded from the World Wide Web at http://www.saitechnology.com/index.php/saisystem-solutions/sai-lte-system-solutions/sai-lte-enodeb on Oct. 23, 2013, 6 pages.

Altera Corporation, 3GPP LTE Basestation Solutions, downloaded from the World Wide Web at http://www.altera.com/end-markets/wireless/lte/channel-card/wir-lte-channel.html on Nov. 8, 2013, 2 pages.

Pasupulet, Kumar Swamy; How LTE Stuff Works?, Nov. 6, 2011, 3 pages.

Shepherd, Andrew J.; RSSI vs. RSRP: A brief LTE Signal Strength Primer, Jul. 16, 2012, 5 pages.

Telesystem Innovations Inc.; LTE in a Nutshell: Protocl Architecture, Apr. 2, 2010, 12 pages.

Etemad, Kamran, CDMA2000 Evolution, System Concepts and Design Principles, 25 pages including Table of Contents, and pp. 38-41, 52, 53, 59-64, and 203-207; published by Wiley-Interscience 2004.

Ghosh, Arunabha; et al.; Fundamentals of LTE, 52 pages including Table of Contents, and pp. 6-18, 227-234, 322-333, 346-350, and 374-376; published by Prentice Hall, 2011.

Altera Corporation, LTE Channel Card SoC Framework, downloaded from the World Wide Web at http://www.altera.com/end-markets/wireless/lte/channel-card/wir-lte-channel.html on Nov. 8, 2013, 2 pages.

Sharetechnote; LTE Quick Reference, RSRQ (Reference Signal Received Quality), downloaded from the World Wide Web at http//www.sharetechnote.com/html/Handbook_LTE_RSRQ.html on Nov. 15, 2013, 1 page.

Sharetechnote; LTE Quick Reference, RSRP (Reference Signal Received Power), downloaded from the World Wide Web at http//www.sharetechnote.com/html/Handbook_LTE_RSRP.html on Nov. 15, 2013, 1 page.

RF Wireless World; LTE Tutorial—LTE Physical layer, eNodeB, UE, downloaded from the World Wide Web at http://www.rfwireless-world.com/Tutorials/LTE-Physical-layer.html on Oct. 23, 2013, 5 pages.

Amberkar, Samir; Telecom Tutorials by Samir Amberkar: UMTS (RRC connection establishment) - 17; Jul. 15, 2010, 1 page.

* cited by examiner

METHODS AND SYSTEMS FOR VARYING RATE OF TRANSMITTING SEQUENCES OF MASTER INFORMATION BLOCKS BASED ON WIRELESS NETWORK CONDITIONS

BACKGROUND

Unless otherwise indicated herein, the elements described in this section are not prior art to the claims and are not admitted to be prior art by inclusion in this section.

A wireless communication system can assist a user of the system in many ways. For example, a user can operate a user-equipment (UE) device, such as a cellular phone, to carry out communications, such as a voice call or a web-browsing session, while the user is moving throughout one or more radio frequency (RF) coverage areas provided by the wireless communication system.

A wireless communication system transmit can transmit RF signals over a forward-link within a coverage area from a base station to a UE device. The RF signals transmitted by the base station can be referred to as forward-link signals. A UE device can transmit RF signals over a reverse-link from the UE device to the base station. The RF signals transmitted by the UE device can be referred to as reverse-link signals.

Under some circumstances, an RF coverage area can become highly loaded (for example (e.g.), congested). A congested RF coverage area can impact a quality level of the service being provided to UE devices operating within the coverage area. Preventing overloading or reducing a load of a congested RF coverage area can be desirable under many circumstances.

OVERVIEW

This application describes several example embodiments, at least some of which pertain to varying a rate of transmitting overhead messages from a network node operating within a wireless communication system. Overhead messages are messages a network node can send to multiple UE devices (e.g., all UE devices), configured to communicate with the network node while in a coverage area of the network node. A rate of transmitting overhead messages can be based on one or more conditions of the wireless network. A network node operating within a wireless network can detect a condition of the network and select the transmission rate based on the detected network condition.

In accordance with at least some of the example embodiments, increasing a rate of transmitting the overhead messages can delay or prevent one or more UE devices from accessing the wireless communication system. Delaying or preventing a UE device from accessing a first RF coverage area of the wireless communication system can result in the UE device attempting to or accessing a second RF coverage area (e.g., an adjacent or nearby sector) of the wireless communication system.

In contrast, and in accordance with at least some of the example embodiments, decreasing a rate of transmitting the overhead message can allow one or more UE devices to access the wireless communication system more quickly. A UE device that accesses the wireless communication system more quickly using a first coverage area can avoid having to access a second RF coverage area provided by the wireless communication system in order to carry out communications at a time of accessing the wireless communication system using the first RF coverage area.

In one respect, an example embodiment can take the form of a method comprising: (i) transmitting, wirelessly by a network node, a first sequence of overhead communications at a first rate, (ii) detecting, by the network node, a wireless network condition associated with the network node, (iii) selecting, by the network node, a second rate for transmitting a second sequence of overhead communications, wherein the first rate differs from the second rate, and (iv) transmitting, by the network node, the second sequence of overhead communications at the second rate.

In another respect, an example embodiment can take the form of a system comprising: a transmitter configured to transmit, wirelessly from a network node, a first sequence of overhead communications at a first rate, a processor, and a computer-readable data storage device storing computer-readable program instructions. The program instructions are executable by the processor to (i) detect a wireless network condition associated with the network node, (ii) select a second rate for transmitting a second sequence of overhead communications, and (iii) to cause the transmitter to transmit the second sequence of overhead communications at the second rate. The first rate differs from the second rate.

In yet another respect, an example embodiment can take the form of a computer-readable data storage device comprising program instructions executable by a processor to cause performance of the following operations (i) transmitting, wirelessly by a network node, a first sequence of overhead communications at a first rate, (ii) detecting, by the network node, a wireless network condition associated with the network node, (iii) selecting, by the network node, a second rate for transmitting a second sequence of overhead communications, wherein the first rate differs from the second rate, and (iv) transmitting, by the network node, the second sequence of overhead communications at the second rate.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings.

DETAILED DESCRIPTION

I. Introduction

This description describes several example embodiments and several figures accompanying the description. Within the description and figures, the articles "a" or "an" are used to introduce elements of the example embodiments. The intent of using those articles is that there is one or more of the elements. The intent of using the conjunction "or" within a described list of at least two terms in the description or figures is to indicate any of the listed terms or any combination of the listed terms. The use of ordinal numbers such as "first," "second," "third" and so on in the description or figures is to distinguish respective elements rather than to denote a particular order of those elements unless the context of using those terms explicitly indicates otherwise.

The diagrams, depictions, and flow charts shown in the figures are provided merely as examples and are not intended to be limiting. Many of the elements illustrated in the figures or described herein are functional elements that can be implemented as discrete or distributed components or in conjunction with other components, and in any suitable combination and location. Those skilled in the art will appreciate that other arrangements and elements (e.g., machines, interfaces, functions, orders, or groupings of functions or operations) can be used instead. Each element or components of an element shown in the figures or described in this description, alone or in combination with one or more other elements or components of the one or more other elements, can be referred to as a system or a machine. Furthermore, various functions or operations described as being performed by one or more elements can be carried out by a processor executing computer-readable program instructions or by any combination of hardware, firmware, or software.

II. Example System Architecture

The example embodiments can be carried out using components of any of a variety of communication systems that include or interface to a wireless network (i.e., a radio network). In general, each communication system can include one or more network nodes operating within or as part of a wireless network, and one or more UE devices.

A communication system can be configured for communicatively connecting a UE device to another device operating within or by a network within the communication system. Each UE device described herein can include, but is not limited to, a mobile device, such as a cellular phone, a tablet device, a smart phone, or an air card (such as a Netgear® 341 USB modem) connectable to a laptop or desktop computer.

A network node and a UE device can transmit to, and receive from the other, radio frequency (RF) communications. The RF communications can conform to a radio interface protocol. A network node can communicate with a UE device using one or more radio interface protocols. Similarly, a UE device can communicate with a network node using one or more radio interface protocols or standards. Examples of the radio interface protocols include, but are not limited to, long term evolution (LTE), code division multiple access (CDMA), WiMAX®, integrated digital enhanced network (IDEN), global system for mobile communications (GSM), general packet radio service (GPRS), universal mobile telecommunications system (UMTS), enhanced data rates for GSM evolution (EDGE), multichannel multipoint distribution service (MMDS), WiFi®, and BLUETOOTH®.

A communication system can include a core network operated by a service provider. A core network can comprise one or more gateways. Each gateway can connect the core network, or a device within or accessing the core network, to another network such as a public-switched telephone network (PSTN). The core network can connect to a UE device using a radio network and, in turn, connect that UE device to another network connected to the core network or to another device using the other network. The core network can perform other services for the UE devices connected to the core network.

Figure 1:
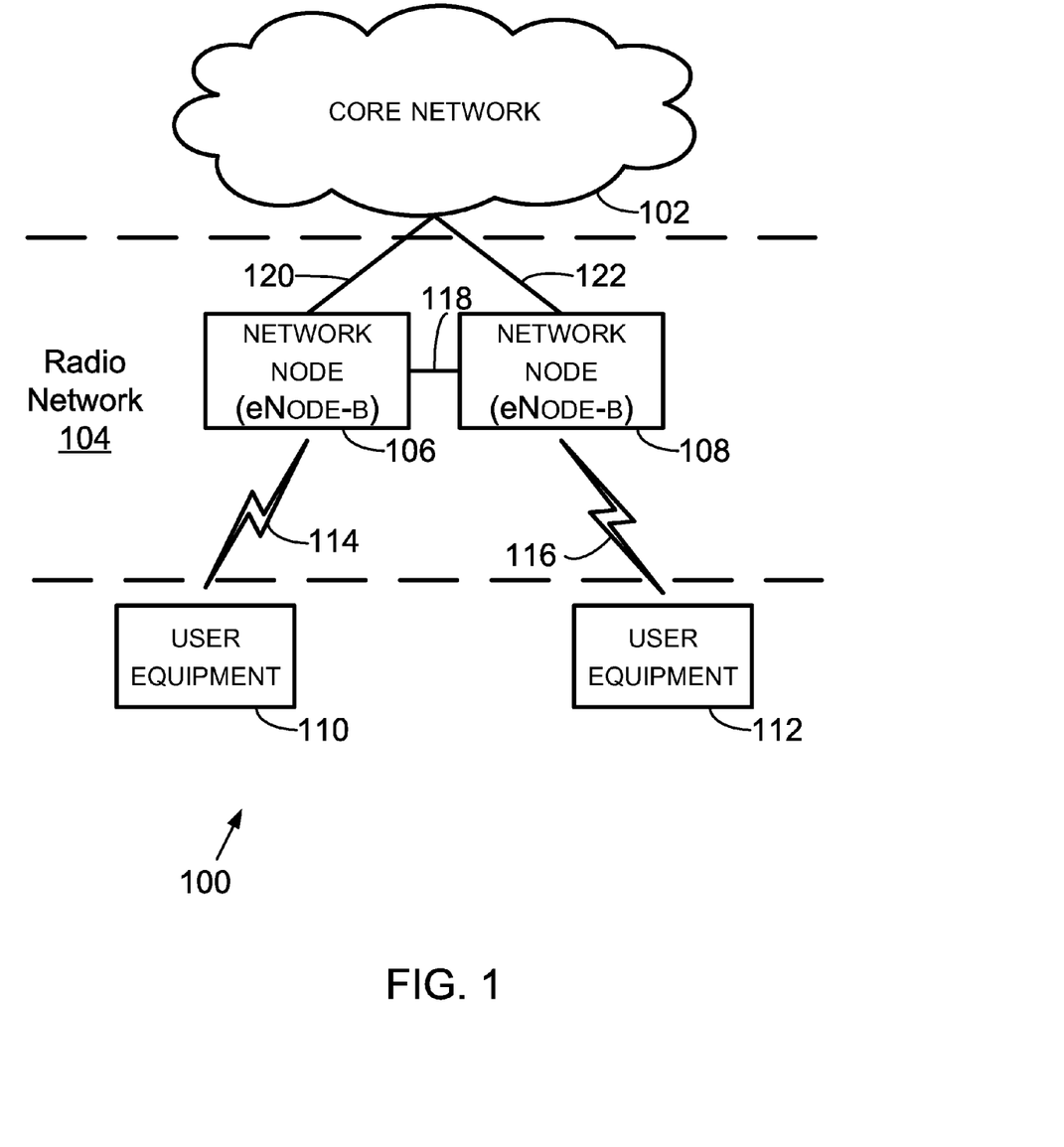
FIG. 1 is a simplified block diagram of an example communication system.

FIG. 1 depicts an example communication system 100 in accordance with one or more of the example embodiments. Communication system 100 includes a core network 102, a radio network (i.e., a wireless network) 104, network nodes 106 and 108, and UE devices 110 and 112.

Communication system 100 can be configured as or include elements of an evolved UMTS terrestrial radio access network (E-UTRAN) for an evolved system defined by the $3^{rd}$ Generation Partnership Project (3GPP). E-UTRAN can be referred to as the Long Term Evolution (LTE). A radio network within an E-UTRAN can operate according to an LTE standard defined by the 3GPP. In accordance with an E-UTRAN and the LTE standard, network nodes 106 and 108 are shown as being an evolved Node B (eNode-B). An eNode B is a base transceiver station (BTS) in a communication system operating within an E-UTRAN or according to the LTE standard.

Network nodes 106 and 108 can communicate with one another using an X2 interface 118 including an X2-C control plane interface and an X2-U user plane interface. Network nodes 106 and 108 and core network 102 can communicate with one another using S1 interfaces 120 and 122, respectively. S1 interfaces 120 and 122 can include an S1-U portion to carry traffic data between network nodes 106 and 108 and a serving gateway in core network 102, and a S1-MME portion to carry signaling between network nodes 106 and 108 and a mobility management entity within core network 102.

Network nodes 106 and 108 provide user equipment 110 and 112 with access to core network 102 by radio interfaces 114 and 116, respectively. The RF signals transmitted from a UE device (such as UE device 110 or 112) to a network node (such as network node 106 or 108) can be referred to as reverse-link signals or reverse-link communications. The RF signals transmitted from a network node (such as network node 106 to 108) to a UE device (such as UE device 110 or 112) can be referred to as forward-link signals or forward-link communications. The forward-link signals or forward-link communications can include a sequence of overhead communications described herein. A sequence of overhead communications can comprise network-access overhead messages. A sequence of overhead communications can comprise one or more overhead messages.

UE devices 114 and 116 can be mobile devices. UE devices 114 and 116 can move from a coverage area provided by a first network node, such as network node 106, to a coverage area provided by a second network node, such as network node 108. At least a portion of the coverage areas provided by one or more network nodes can overlap. A UE device, such as UE device 114 or 116, can operate at a fixed location or as a fixed-location UE device.

Figure 2:
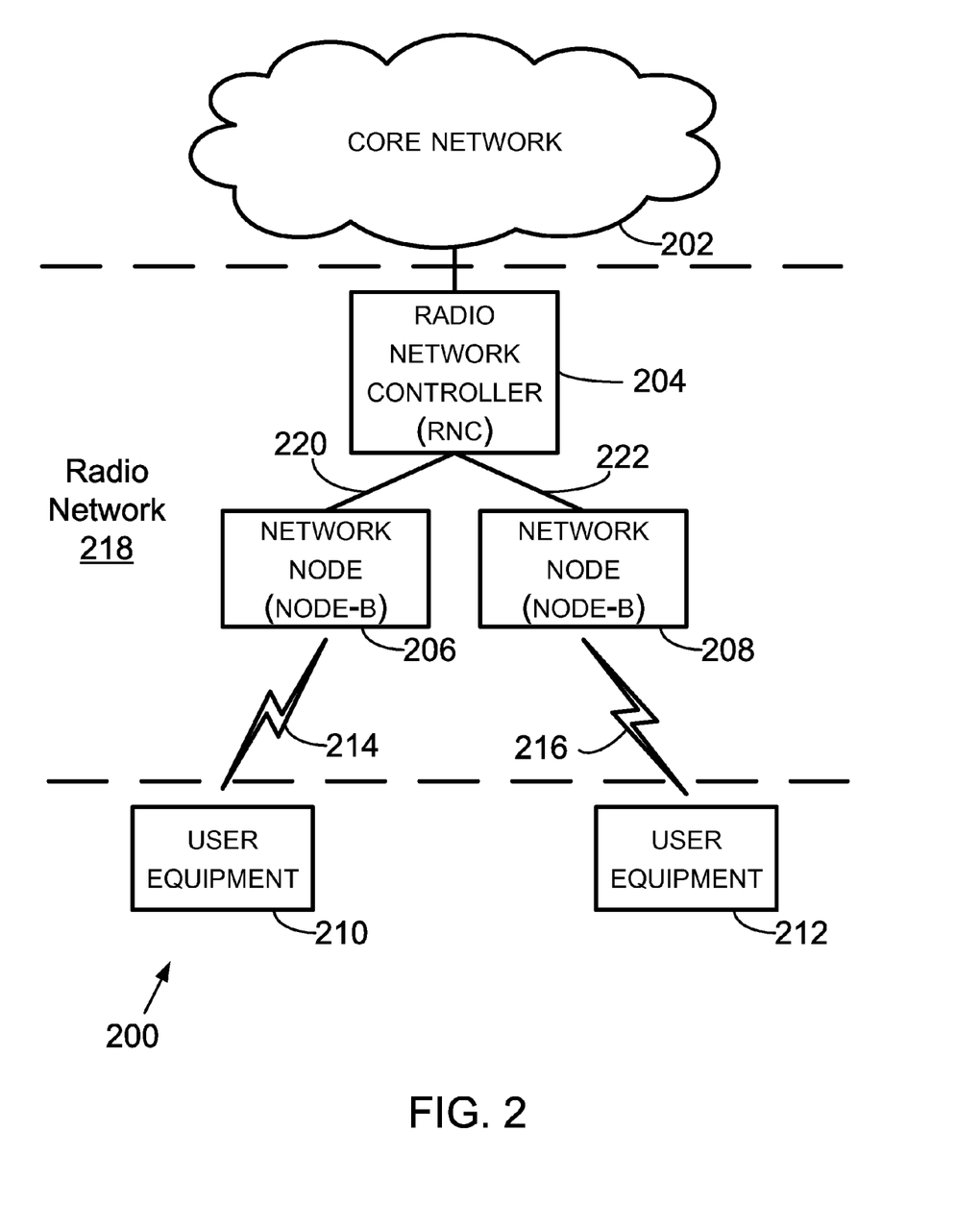
FIG. 2 is a simplified block diagram of another example communication system.

Next, FIG. 2 depicts an example communication system 200 in accordance with one or more of the example embodiments. Communication system 200 includes a core network 202, a radio network (i.e., a wireless network) 218, a radio network controller (RNC) 204, network nodes 206 and 208, and UE devices 210 and 212.

Communication system 200 can be configured as or include elements of a UMTS terrestrial radio access network (UTRAN) for a 3G system defined by the 3GPP. A radio network within a UTRAN can operate according to a wide-band CDMA (W-CDMA) standard defined or adopted by the 3GPP. In accordance with a UTRAN and a W-CDMA standard, network nodes 206 and 208 are shown as being a Node B. A node B is a base transceiver station (BTS) in a network operating according to the UMTS. Communication system 200 can be configured to use a different or at least one other radio network standard.

RNC 204 controls one or more network nodes, such as network nodes 206 and 208 configured like node-Bs. RNC 204 can facilitate handover of UE devices 210 and 212 from a first network node (e.g., network node 206) to a second network node (e.g., network node 208) when those UE devices move from the coverage areas provided by the first network node and the second network node. A Iub interface 220 and a Iub interface 222 can link network node 206 and network node 208, respectively, with RNC 204.

Network nodes 206 and 208 provide user equipment 210 and 212 with access to core network 202 by radio interfaces 214 and 216, respectively. The RF signals transmitted from a UE device (such as UE device 210 or 212) to a network node (such as network node 206 or 208) can be referred to as reverse-link signals or reverse-link communications. The RF signals transmitted from a network node (such as network node 206 to 208) to a UE device (such as UE device 210 or 212) can be referred to as forward-link signals or forward-link communications. The forward-link signals or forward-link communications can include a sequence of overhead communications described herein.

UE devices 210 and 212 can be mobile devices. UE devices 210 and 212 can move from a coverage area provided by a first network node, such as network node 206, to a coverage area provided by a second network node, such as network node 208. At least a portion of the coverage areas provided by one or more network nodes can overlap.

Figure 3:
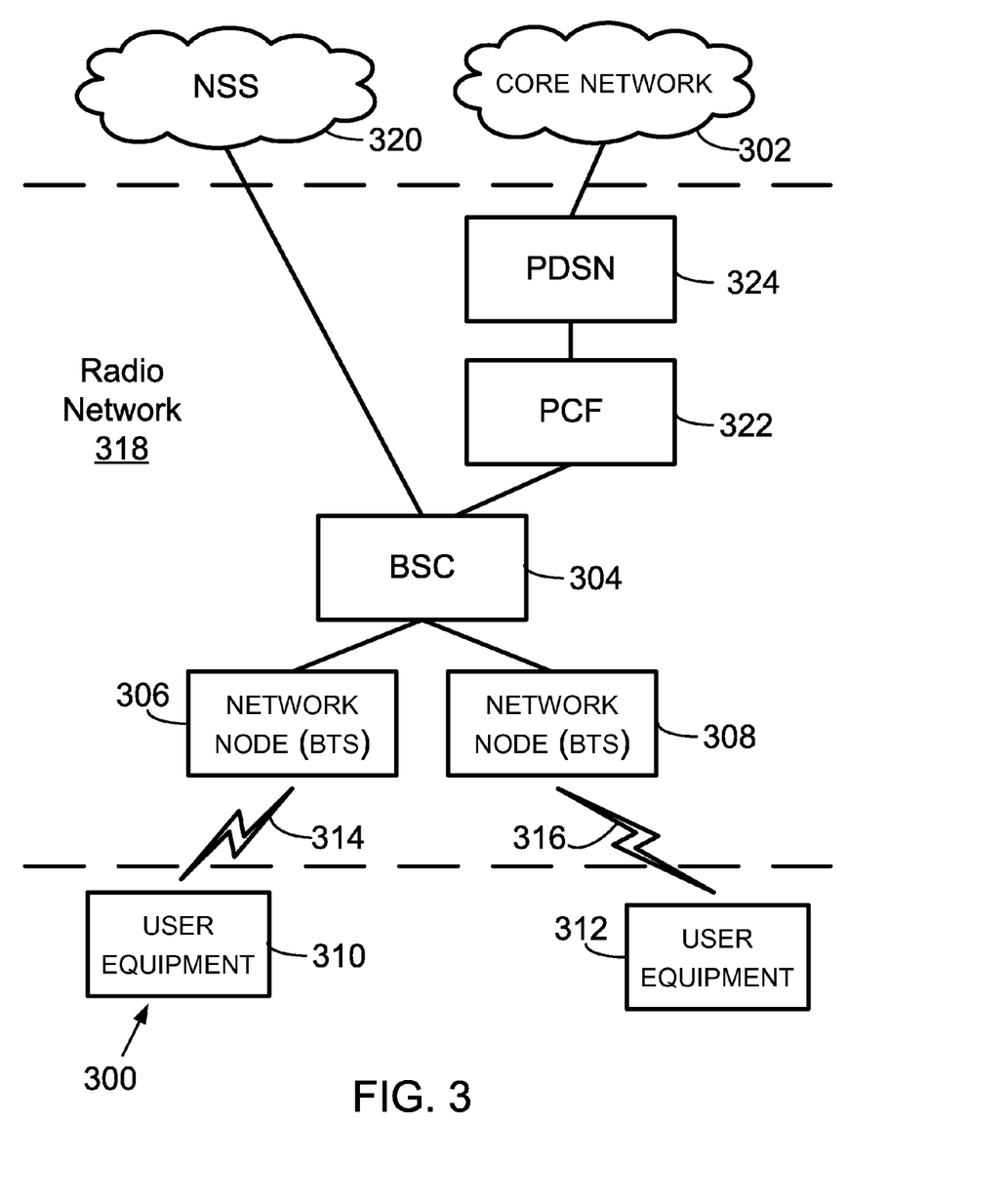
FIG. 3 is a simplified block diagram of another example communication system.

Next, FIG. 3 depicts an example communication system 300 in accordance with one or more of the example embodiments. Communication system 300 includes a core network 302, a radio network (i.e., a wireless network) 318, a base station controller (BSC) 304, network nodes 306 and 308, a network switching subsystem (NSS) 320, a packet control function (PCF) device 322, a packet data serving node (PDSN) 324, and UE devices 310 and 312.

Communication system 300 can be configured as or include elements of an EIA-TIA-95A network, a CDMA2000 network, or a GSM network. Network nodes 306 and 308 are shown as being a BTS. Communication system 300 can be configured to use a CDMA standard, such as CDMA2000-1X or CDMA2000-1X-EVDO. Communication system 300 can be configured to use a different or at least one other radio network standard.

PCF 322 can buffer and relay packets of data between BSC 304 and PDSN 324. PDSN 324 can manage a radio-packet interface and point-to-point sessions for UE devices, such as UE devices 310 and 312.

BSC 304 controls one or more network nodes, such as network nodes 306 and 308 configured like BTSs. BSC 304 can facilitate handover of UE devices 310 and 312 from a first network node to a second network node when those UE devices move from the coverage areas provided by the first network node and the second network node. BSC 304 can interface to a switch, such as a mobile switching center, within NSS 320 to carry out telephone calls between UE devices 310 and 312 and devices accessible by NSS 320. NSS 320 can include or provide connection to the PSTN.

Network nodes 306 and 308 provide user equipment 310 and 312 with access to core network 302 or NSS 320 by radio interfaces 314 and 316, respectively. The RF signals transmitted from a UE device (such as UE device 310 or 312) to a network node (such as network node 306 or 308) can be referred to as reverse-link signals or reverse-link communications. The RF signals transmitted from a network node (such as network node 306 to 308) to a UE device (such as UE device 310 or 312) can be referred to as forward-link signals or forward-link communications. The forward-link signals or forward-link communications can include a sequence of overhead communications described herein.

UE devices 310 and 312 can be mobile devices. UE devices 310 and 312 can move from a coverage area provided by a first network node, such as network node 306, to a coverage area provided by a second network node, such as network node 308. At least a portion of the coverage areas provided by one or more network nodes can overlap.

III. Example Network Node

Figure 4:
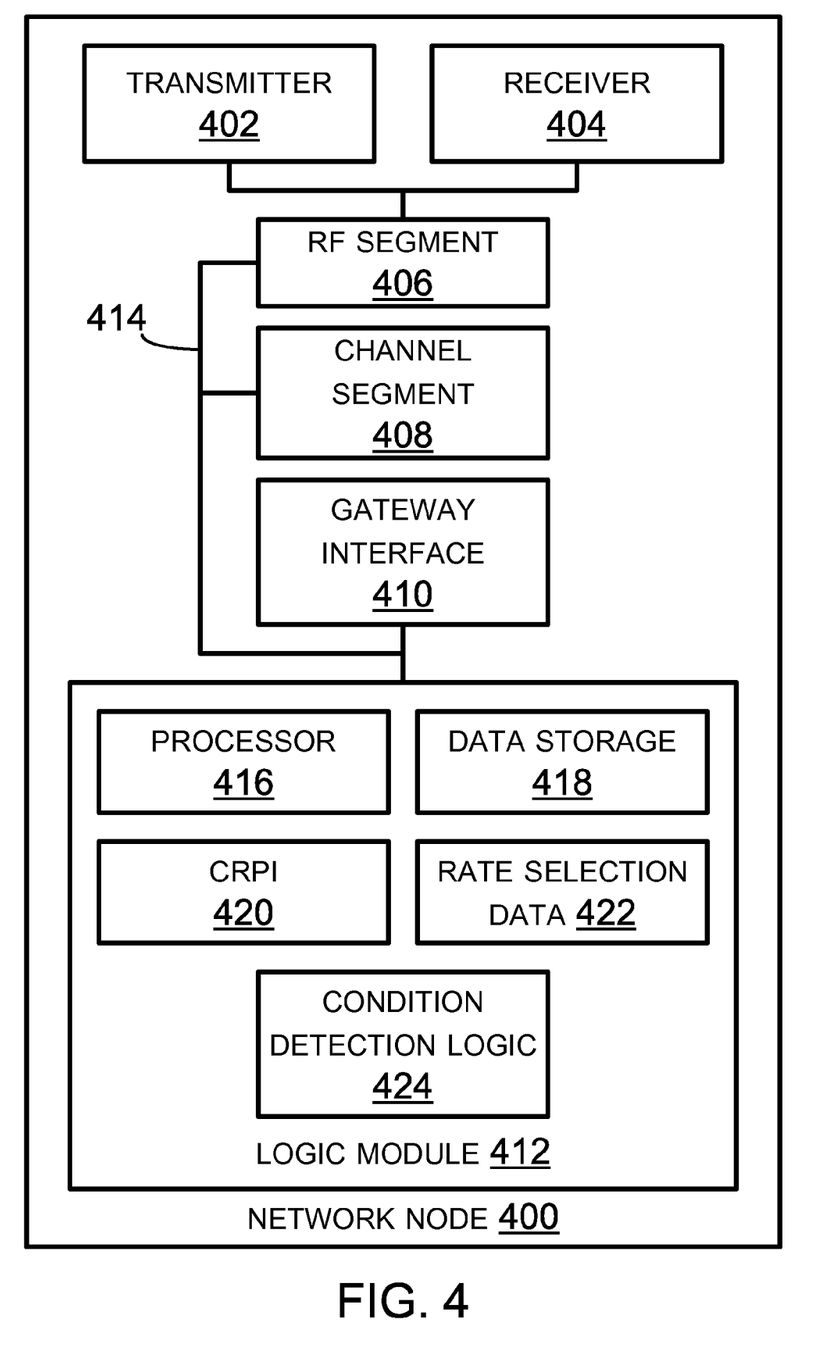
FIG. 4 is a simplified block diagram of a network node configured for use in a communication system such as the communication system shown in FIG. 1, FIG. 2, or FIG. 3.

Next, FIG. 4 is a block diagram of an example network node 400 in accordance with one or more example embodiments. Network nodes 106, 108, 206, 208, 306, and 308 can be configured like network node 400. In one respect, network node 400 can be configured like an eNode-B and operate within communication system 100. In another respect, network node 400 can be configured like a Node-B and operate within communication system 200. In yet another respect, network node 400 can be configured like a BTS and operate within communication system 300. In still yet another respect, network node 400 can operate with another communication system.

As shown in FIG. 4, network node 400 includes a transmitter 402, a receiver 404, an RF segment 406, a channel segment 408, a gateway interface 410, and a logic module 412, all of which can be linked together via a system bus, network, or other connection mechanism 414. Logic module 412 can include a processor 416, a data storage device 418, computer-readable program instructions (CRPI) 420, rate selection data 422, and condition detection logic 424.

Transmitter 402 can comprise an RF transmitter to transmit RF communications to UE devices using an air interface, such as air (radio) interface 114, 214, or 314. The RF transmitter can comprise or connect to a power amplifier and an antenna. The communications transmitted by transmitter 402 can include bearer traffic, signaling, and overhead messages.

Receiver 404 can comprise an RF receiver to receive RF communications transmitted by UE devices operating in a communication system, such as communication system 100, 200, or 300. Receiver 404 can comprise or be connected to one or more antennas. Receiver 404 can comprise a low noise amplifier (LNA) for amplifying signals (e.g., weak signals) received by receiver 404. Receiver 404 can provide the received RF communications to RF segment 406. The communications received by receiver 404 can include bearer traffic and signaling.

RF segment 406 can include one or more converters (e.g., analog-to-digital converters, digital-to-analog converters, digital down-converters or digital up-converters) for providing communications (e.g., messages, data, or signaling) to be transmitted by transmitter 402 or for providing communications received by receiver 404 to channel segment 408 or another portion of network node 400. RF segment 406 can generate overhead messages on a carrier signal for transmitting by transmitter 402.

Channel segment 408 can include a segment for processing baseband signaling provided from a down-converter within RF segment 406. Channel segment 408 can include a multiplexer to multiplex signals to be transmitted by transmitter 402. Channel segment 408 can include a demultiplexer to recover multiplexed signals received by receiver 404.

Gateway interface 410 can comprise a gateway (e.g., one or more gateways) to an element in a core network or another element in a radio access network. Gateway 410 can include different gateways depending on the communication system in which network node 400 is operating.

A network node configured like an e-node-B in communication system 100 can include a gateway to a serving gateway for providing internet protocol (IP) data traffic from a UE device to core network 102, and a gateway to a mobility management entity (MME) within core network 102. The MME can handle a control plane of communication system 100 and signaling pertaining to mobility and security for UE devices.

A network node configured like a node-B in communication system 200 can include a gateway to a radio network controller, such as RNC 204.

A network node configured like a BTS in communication system 300 can include a gateway to a base station controller, such as BSC 308.

Gateway interface 410 can include a packet data network (PDN) gateway for connecting to a packet data network (such as the Internet or the World Wide Web). As another example, gateway interface 410 can include a serving gateway to route data packets to a core network, such as core network 102, 202, or 302 and to receive data packets from the core network.

Processor 416 can comprise one or more general purpose processors (e.g., INTEL single core microprocessors or INTEL multicore microprocessors) or one or more special purpose processors (e.g., application specific integrated circuits (ASICs) or digital signal processors (DSPs)). Processor 416 can execute computer-readable program instructions, such as computer-readable program instructions (CRPI) 420.

Data storage device 418 can comprise a non-transitory computer-readable storage medium readable by processor 416. The computer-readable storage medium can comprise volatile and/or non-volatile storage components, such as optical, magnetic, organic or other memory or disc storage, which can be integrated in whole or in part with processor 416. Data storage device 418 may also or alternatively be provided separately, as a non-transitory machine readable medium.

CRPI 420 comprises computer-readable program instructions executable by processor 416. CRPI 420, or a portion thereof, can be stored within data storage device 418, rate selection data 422, or condition detection logic 424. CRPI 420 can include program instructions that are executable by processor 416 to perform any function described herein as being performed or performable by network node 400. CRPI 420 can include program instructions that are executable by processor 416 to perform any function shown in FIG. 5.

CRPI 420 can include program instructions to detect a condition of a wireless network. As an example, a condition of a wireless network can include a condition of an air interface between network node 400 and one or more UE devices operating within a coverage area or sector provided by network node 400. The condition of an air interface can be a condition detected by network node 400 or by a UE device that transmits notice of the detected condition to network node 400. As another example, a condition of a wireless network can include a condition within network node 400 or within a UE device.

Rate selection data 422 can comprise data for selecting a rate for transmission of overhead communications. Rate selection data 422, or a portion thereof, can be stored within data storage device 418. Rate selection data 422 can be stored in any of a variety of formats, such as in a computer-readable table format. Table 1 includes example of rate selection data storable in a computer-readable table.

TABLE 1

| Rate | Condition Type 1 | Condition Type 2 | Condition Type 3 |
| --- | --- | --- | --- |
| Rate 1 | Condition 1 | Condition 4 | N.A. |
| Rate 2 | Condition 2 | Condition 5 | Condition 6 |
| Rate 3 | Condition 3 | N.A. | Condition 7 |

With respect to Table 1, and as an example, rate 1 can be 80 milliseconds (ms), rate 2 can be 160 ms, and rate 3 can be 240 ms. Other example rates could be associated with rate 1, rate 2, or rate 3 instead of the aforementioned examples. Also, a number of rates less than or greater than three can be defined as part of rate selection data 422. For instance, a rate 0 of 40 ms or some other amount of time can be defined as a default rate along with rate 1, rate 2, and rate 3 or in place of rate 1 and rate 2. Network node 400 could operate using rate 0, i.e., the default rate, under various circumstances, such as at an initial power on of network node 400, after a power failure condition at network node 400, or some other circumstance.

Table 1 includes three condition types (i.e., condition type 1, condition type 2, and condition type 3) that are associated with at least one rate. A condition type can identify a condition detectable by network node 400.

In one respect, network node 400 can detect a condition of a device other than network node 400, such as a UE device. In this respect, network node 400 can detect the condition from a parameter or message received by network node 400 from the other device. The parameter, or data within the message, can indicate existence or non-existence of a condition, and network node 400 can detect the condition using the parameter or data. As an example, the parameter or data can comprise a channel quality indicator (CQI) parameter or data, a reference signal received power (RSRP) parameter or data, or a reference signal received quality (RSRQ) parameter or data or signal to interference ratio (SINR), each of which can be transmitted to network node 400.

In another respect, network node 400 can detect a condition of network node 400. As an example, network node 400 can detect an intermodulation distortion or passive intermodulation (such as intermodulation caused to non-linearity in coaxial cables, connectors or antennas) conditions occurring at network node 400. Intermodulation distortion can result from two or more input signals received by network node 400 mixing together to form signals at non-harmonic frequencies with respect to frequencies of the input signals. The input signals can be from UE devices operating in the radio access network provided by network node 400.

Referring back to Table 1, condition type 1 can be a CQI condition, condition type 2 can be an RSRP condition, and condition 3 can be an intermodulation distortion condition. Other example conditions could be associated with condition type 1, condition type 2, or condition type 3 instead of or in combination with a condition of the aforementioned examples.

Various levels (e.g., measurement levels) can be associated with each condition type. For instance, condition type 1 is associated with condition (level) 1, condition (level) 2, and condition (level) 3. Each condition of a condition type can be associated with a respective rate within rate selection data 422. Conditions from two or more distinct condition types can be associated with a common rate within rate selection data 422.

Condition detection logic 424 can comprise logic (e.g., hardware circuitry or CRPI) for use in detecting various wireless network conditions. Condition detection logic 424, or a portion thereof, can be stored within data storage device 418 or can be contained within processor 416. Condition detection logic 424, or a portion thereof, can include CRPI executed by processor 416 to detect a condition from a parameter or message, such as a parameter or message indicating a CQI, RSRP, or RSRQ value detected by a UE device.

Condition detection logic 424, or a portion thereof, can be configured to detect intermodulation distortion in any of a variety of ways. For example, condition detection logic 424 can detect intermodulation distortion as described in U.S. Pat. No. 7,876,867 (entitled "Intermodulation Distortion Detection and Mitigation") or in some other manner, at least one of which does not include every feature of and is not equivalent to any claim of U.S. Pat. No. 7,876,867

IV. Example Operation

Figure 5:
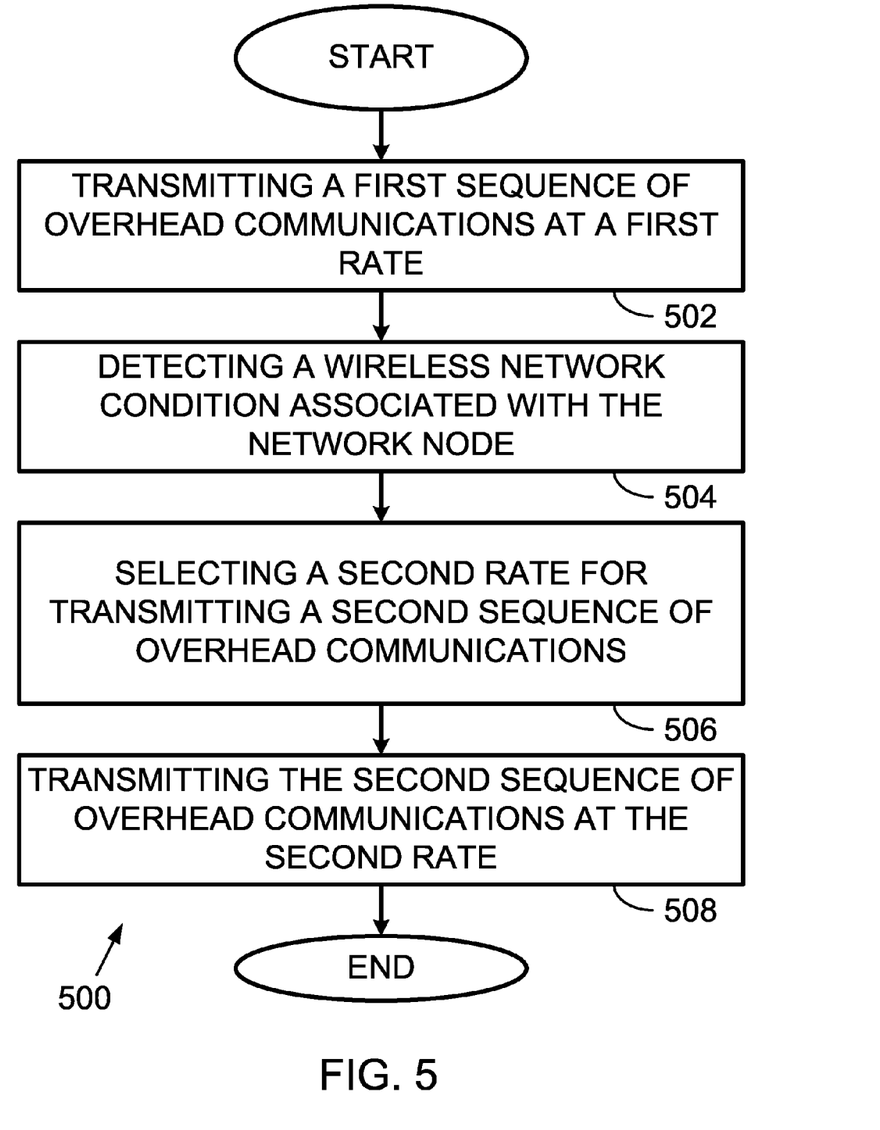
FIG. 5 is a flowchart depicting a set of functions that can be carried out in accordance with one or more example embodiments described herein.

FIG. 5 depicts a flowchart showing a set of functions (e.g., operations) 500 (or more simply, "the set 500") that can be carried out in accordance with any or one or more of the example embodiments described herein. The functions of the set 500 are shown within blocks labeled with even integers between 502 and 508, inclusive. Any other function(s) described herein can be performed prior to, while, or after performing any one or more of the functions of the set 500. Those other function(s) can be performed in combination with or separately from any one or more of the functions of the set 500.

Block 502 includes transmitting a first sequence of overhead communications at a first rate. In general, transmitting the first sequence of overhead messages can occur by a network node, such as network node 106, 206, 306, or 400. In particular, transmitting the first sequence of overhead messages can occur using a transmitter, such as transmitter 402, in one of the network nodes. The transmission of the overhead communications or messages can occur over an air interface between the network node and one or more UE devices.

The first sequence of overhead communications can be overhead communications configured for transmission in a communication system, such as communication system 100, 200, or 300. In accordance with one or more of the example embodiments, the overhead communications can include information that UE devices use in order to be able to request access to system resources, such as forward-link channels to carry forward-link communications or reverse-link channels to carry reverse-link communications. The information included within the overhead communications can, for example, include access parameters or the like. Those overhead communications can comprise network-access overhead communications or messages.

For a communication system configured to operate according to an LTE standard, such as communication system 100, the first sequence of overhead communications can, for example, comprise a master information block MIB transmitted on a forward-link physical broadcast channel (PBCH) or a system information block (SIB) transmitted on a forward-link physical downlink shared channel (PDSCH). Other example(s) of overhead messages or network-access overhead messages configured for use in communication system 100 are also possible.

For a communication system configured to operate according to a UMTS standard, such as communication system 200, the first sequence of overhead communications can, for example, comprise a network-access overhead message, such as a radio resource control (RRC) connection setup message. An RRC connection setup message can identify radio bearers and transport channels mapped to the radio bearers, an RRC state indicator, physical channel frequency information, among other information. Other example(s) of overhead messages or network-access overhead messages configured for use in communication system 200 are also possible.

For a communication system configured to operate according to a W-CDMA standard, such as communication system 300, the first sequence of overhead communications can, for example, comprise network-access overhead messages, such as an access parameters message (APM) or a system parameter message (SPM). An APM can include values, such as a power offset value, a nominal power value, a nominal power for extended handoff value, an initial power value, and a power step value. An SPM can identify, among other parameters, a frequency assignment for a primary forward-link paging channel or search window settings for UE devices to use to search for forward-link pilot signals. A UE device may use an APM for accessing resources of a network node. A UE device can use an SPM for handoff from using resources of a first network node to using resources of a second network node. Other example(s) of overhead messages or network-access overhead messages configured for use in communication system 300 are also possible.

Processor 416 can select the first rate prior to transmission of the first sequence of overhead communications. As an example, processor 416 can select a default rate (e.g., the rate 0 described above) for any of a variety of reasons, such an initial power-up of network node 400 or network node 400 resetting. As another example, processor 416 can select another rate from rate selection data 422 as part of a previous instance of performing the functions of the set 500.

Transmission of the first sequence of overhead communications can occur periodically, such as every 40 ms. Alternatively, transmission of the first sequence of overhead communications can occur substantially periodically. Transmission of the first sequence of overhead communications can be scheduled for periodic transmission but can occur substantially periodically for any of a variety of reasons, such as transmission of a message within the first sequence is delayed because another message was being transmitted when the delayed message was supposed to be transmitted. As an example, a substantially periodic rate could equal a period rate±ten percent of the periodic rate. As another example, a substantially periodic rate could equal a periodic rate±10 ms. Other examples of a periodic rate are also possible.

Next, block 504 includes detecting a wireless network condition associated with the network node. Network node 400 or one or more components thereof can detect the wireless network condition. For instance, processor 416 or condition detection logic 424 can detect the wireless network condition.

In one respect, receiver 404 can receive, from one or more UE devices, data indicating a condition of the wireless network in which the UE device(s) are operating. Network node 400 can use the received data to detect the wireless network condition. The received data can indicate a physical layer measurement performed by a UE device.

As an example, the data provided by the UE device(s) to network node 400 can include a channel quality indicator (CQI) (e.g., a CQI value) that indicates a channel quality measurement performed by a given UE device. The measurement can be performed on a channel between the given UE device and network node 406. The channel can be a pilot signal transmitted by RF segment 406 or another channel.

The CQI for a channel of communication system 200 operating under a high-speed downlink packet access (HSPDA) protocol can be an integer value within the range 0 to 30, inclusive, where a CQI (value) of 30 can indicate best channel quality and a CQI of 0 can indicate the poorest channel quality. The CQI used for communication systems 100 and 300 can use the same or different values. A CQI (value) can represent (e.g., be mapped to) a data rate at which a UE device can receive data from network node 406, a number of channels, a modulation type, or some other feature. Rate selection data 422 can include CQI values and data indicating the features mapped to each CQI.

Detecting the wireless network condition can include determining a wireless network condition value using data received from multiple UE devices. As an example, processor 416 can determine an average value (i.e., a mean value) of data values provided by multiple UE devices during a given time period (e.g., a time period network node 400 provided to UE devices to request transmission of CQI). Processor 416 can determine an average CQI value based on CQI values provided by multiple UE devices being served by network node 400.

As another example, processor 416 can detect a wireless network condition by determining a maximum or minimum CQI value of a set of CQI values network node 400 receives from the UE devices it is serving during the given time period. That detection can include processor 416 comparing the determined maximum or minimum CQI value to one or more CQI threshold values. The CQI threshold values can be stored in rate selection data 422.

As yet another example, processor 416 can detect a wireless network condition by detecting a change between a first (earlier detected) wireless network condition (e.g., a first CQI) and a second (later detected) wireless network condition (e.g., a second CQI). In this regard, detecting the condition can include determining a difference between the first CQI and the second CQI. Processor 416 can compare the determined difference to a difference threshold to determine whether the determined difference warrants changing a rate at which the network-access overhead messages are being transmitted.

Other examples of the data provided by the UE device(s) to network node 400 for use to determine a wireless network condition are also possible. For instance, the data can include RSRP parameters or data, RSRQ parameters or data, or some other data from the UE device(s). Processor 416 can determine a wireless network condition value using any of this other example data received from multiple UE device(s) by, for example, determining an average value, a maximum or minimum value, or a change between first and second values in a manner similar to detecting the wireless network condition based on CQI.

In another respect, network node 400 can detect the wireless network condition based on measurements performed by network node 400 or a component thereof (e.g., processor 416 or condition detection logic 424). As an example, network node 400 can perform a physical layer measurement of a wireless resource, for example a channel or signal, provided by or received at network node 400.

As another example of a wireless network condition detected by the network node, as described above, condition detection logic 414 can be configured to detect intermodulation distortion. Processor 416 can detect a change between a first (earlier detected) intermodulation detection measurement and a second (later detected) intermodulation detection measurement. In this regard, detecting the condition can include determining a difference between the first intermodulation detection measurement and the second intermodulation detection measurement. Other examples of wireless network conditions detected based on measurements made by network node 400 are also possible.

Next, block 506 includes selecting a second rate for transmitting a second sequence of overhead communications. Processor 416 can execute a portion of CRPI 420 to select, from rate selection data 422, the second rate based on the determined wireless network condition.

At some point in time after selecting the second rate, processor 416 can again select, from rate selection 422, a rate based on a wireless network condition determined by processor 416. In this way, processor 416 can select a rate for transmission of overhead communications that matches a wireless network condition in order to delay or possibly prevent some UE devices from accessing resources of the network node and to better server UE devices currently using resources of the network node.

Next, block 508 includes transmitting the second sequence of overhead communications at the second rate. In general and similar to transmitting the first sequence of overhead messages, transmitting the second sequence of overhead messages can occur by a network node, such as network node 106, 206, 306, or 400. In particular, transmitting the second sequence of overhead messages can occur using a transmitter, such as transmitter 402, in one of the network nodes. The transmission of the overhead communications or messages can occur over an air interface between the network node and one or more UE devices.

The second sequence of overhead communications can be overhead communications configured for transmission in a communication system, such as communication system 100, 200, or 300. The overhead communications transmitted using the second rate can be the same type of overhead communications transmitted using the first rate. One or more data values within two distinct overhead communications transmitted using the first rate or the second rate can be different. One or more data values within two distinct overhead communications transmitted using the first rate or the second rate can be the same.

After selecting the second rate and transmitting the second sequence of overhead communications, a network node can detect another wireless network condition associated with the network node, select another rate for selecting another sequence of overhead communications, and transmit the other sequence of overhead communications and repeat one or more other times. As an example, the other rate can be considered a third rate and the other sequence of overhead communications can be considered a third sequence of overhead communications. Two sequences of sequence of overhead communications, separated by at least one other transmitted sequence of overhead communications can be transmitting using a common transmission rate.

During performance of the set 500, the network node can stop transmitting overhead communications at the first rate. A last message transmitted at the first rate can be a last message of the first sequence of overhead communications. As an example, the network node can stop transmitting overhead communications at the first rate in response to detecting the wireless network condition or in response to selecting the second rate. The network node can vary a rate of transmitting overhead communications by transmitting overhead communication at the first rate, stopping transmission of overhead communications at the first rate, and then transmitting additional overhead communications at the second rate.

V. Conclusion

Example embodiments have been described above. Those skilled in the art will understand that changes and modifications can be made to the described embodiments without departing from the true scope and spirit of the present invention, which is defined by the claims.

I claim:

1. A method for a long term evolution (LTE) radio network, the method comprising:
   transmitting, by an eNode-B of the LTE radio network over a wireless broadcast channel, a first sequence of multiple master information blocks at a first periodic rate;
   detecting, by the eNode-B, a wireless network condition associated with the eNode-B matches a wireless network condition defined to delay or prevent one or more user equipment devices from accessing resources of the eNode-B;
   selecting, by the eNode-B based on the detected wireless network condition matching the wireless network condition defined to delay or prevent the one or more user equipment devices from accessing the resources of the eNode-B, a second periodic rate for transmitting a second sequence of multiple master information blocks, wherein the second periodic rate is greater than the first periodic rate; and
   transmitting, by the eNode-B over the wireless broadcast channel, the second sequence of multiple master information blocks over the wireless broadcast channel at the second periodic rate,
   wherein the multiple master information blocks of the first sequence and the multiple master information blocks of the second sequence include information usable by the one or more user equipment devices to request access to the resources of the eNode-B.

2. The method of claim 1, wherein detecting the wireless network condition includes detecting a change in the wireless network condition from a first condition to a second condition.

3. The method of claim 2, further comprising:
   receiving, by the eNode-B from a user-equipment device, a communication including data for detecting the change in the wireless network condition,
   wherein the eNode-B uses the data received from the user-equipment device to detect the change in the wireless network condition.

4. The method of claim 3, wherein the communication received from the user-equipment device comprises a physical layer measurement performed by the user-equipment device.

5. The method of claim 3,
   wherein the eNode-B comprises a base transceiver station, and
   wherein receiving the communication including the data for detecting the change in the wireless network condition comprises receiving a channel quality indicator indicating a channel quality measurement performed by the user equipment device.

6. The method of claim 5, further comprising:
   receiving, by the eNode-B, multiple channel quality indicators from a plurality of user equipment devices; and
   determining, by the eNode-B, an average channel quality value based on the multiple channel quality indicators,
   wherein the eNode-B uses the average channel quality value to detect the change in the wireless network condition.

7. The method of claim 2, further comprising:
   performing, by the eNode-B, a physical layer measurement,
   wherein detecting the change in the wireless network condition is based on the physical layer measurement performed by the eNode-B.

8. The method of claim 2, further comprising:
   detecting, by the eNode-B, a intermodulation distortion within an input signal received by the eNode-B,
   wherein detecting the change in the wireless network condition is based on detecting the intermodulation distortion within the input signal received by the eNode-B.

9. The method of claim 2, further comprising:
   storing, by a data storage device, a data structure including data that defines two or more periodic rates, and for each periodic rate, at least one associated wireless network condition parameter,
   wherein the second periodic rate is selected from the data structure based on a wireless network condition parameter associated with the change in the wireless network condition.

10. The method of claim 1, further comprising:
    detecting, by the eNode-B, a change in the wireless network condition associated with the eNode-B;
    selecting, by the eNode-B based on the detected change in the wireless network condition, a third periodic rate for transmitting a third sequence of multiple master information blocks, wherein the third periodic rate differs from both the first periodic rate and the second periodic rate; and
    transmitting, by the eNode-B, the third sequence of multiple master information blocks over the wireless broadcast channel.

11. A system for an eNode-B of a long term evolution (LTE) radio network comprising:
    a transmitter configured to transmit, from the eNode-B of the LTE network over a wireless broadcast channel, a first sequence of multiple master information blocks at a first periodic rate;
    a processor; and
    a computer-readable data storage device storing computer-readable program instructions executable by the processor to:
    (i) detect a wireless network condition associated with the eNode-B matches a wireless network condition defined to delay or prevent one or more user equipment devices from accessing resources of the eNode-B,
    (ii) select, based on the detected wireless network condition matching the wireless network condition defined to delay or prevent the one or more user equipment devices from accessing the resources of the eNode-B, a second periodic rate for transmitting a second sequence of multiple master information blocks, and (iii) cause the transmitter to transmit the second sequence of multiple master information blocks over the wireless broadcast channel at the second periodic rate, wherein the second periodic rate is greater than the first periodic rate, and wherein the multiple master information blocks of the first sequence and the multiple master information blocks of the second sequence include information usable by the one or more user equipment devices to request access to the resources of the eNode-B.

12. The system of claim 11,
wherein the computer-readable data storage device stores rate selection data including data that associates at least a first wireless network condition with the first periodic rate, and data that associates at least a second wireless network condition with the second periodic rate, and wherein the processor uses the rate selection data to select the second periodic rate for transmitting the second sequence of multiple master information blocks.

13. The system of claim 11, further comprising:
condition detection logic configured for detecting the wireless network condition, wherein the processor detects the wireless network condition associated with the eNode-B from the condition detection logic.

14. The system of claim 11, further comprising:
a receiver configured to receive a physical measurement carried out by a user-equipment device;

wherein the processor detects the wireless network condition associated with the eNode-B based on the received physical measurement.

15. The system of claim 11, wherein the eNode-B comprises a base transceiver station.

16. The system of claim 11,
wherein the program instructions are executable by the processor to:

(iv) detect a change in the wireless network condition associated with the eNode-B;

(v) select, based on the detected change in the wireless network condition, a third periodic rate for transmitting a third sequence of multiple master information blocks, wherein the third periodic rate differs from both the first periodic rate and the second periodic rate; and (vi) transmit the third sequence of multiple master information blocks over the wireless broadcast channel at the third periodic rate.

17. A non-transitory computer-readable data storage device comprising program instructions executable by at least one processor of an eNode-B of a long term evolution (LTE) radio network to cause a computing system to perform functions comprising:

transmitting, by a transmitter of the eNode-B over a wireless broadcast channel, a first sequence of multiple master information blocks at a first periodic rate;

detecting, by the at least one processor of the eNode-B, a wireless network condition associated with the eNode-B matches a wireless network condition defined to delay or prevent one or more user equipment devices from accessing resources of the eNode-B;

selecting, by the at least one processor of the eNode-B based on the detected wireless network condition matching the wireless network condition defined to delay or prevent the one or more user equipment devices from accessing the resources of the eNode-B, a second periodic rate for transmitting a second sequence of multiple master information blocks, wherein the second periodic rate is greater than the first periodic rate; and transmitting, by the transmitter of the eNode-B, the second sequence of multiple master information blocks over the wireless broadcast channel at the second periodic rate, wherein the multiple master information blocks of the first sequence and the multiple master information blocks of the second sequence include information usable by the one or more user equipment devices to request access to the resources of the eNode-B.

18. The computer-readable data storage device of claim 17, wherein the functions further comprise:
receiving, by the eNode-B from a user-equipment device, a communication including data for detecting a change in the wireless network condition, wherein the eNode-B uses the data received from the user-equipment device to detect the change in the wireless network condition.

19. The computer-readable data storage device of claim 17, wherein the functions further comprise:
storing, by the data storage device, a data structure including data that defines two or more periodic rates, and for each periodic rate, at least one associated wireless network condition parameter, wherein the second periodic rate is selected from the data structure based on a wireless network condition parameter associated with a change in the wireless network condition.

20. The non-transitory computer-readable data storage device of claim 17,
wherein the functions further comprise:
detecting, by the eNode-B, a change in the wireless network condition associated with the eNode-B;

selecting, by the eNode-B based on the detected change in the wireless network condition, a third periodic rate for transmitting a third sequence of multiple master information blocks, wherein the third periodic rate differs from both the first periodic rate and the second periodic rate; and transmitting, by the eNode-B, the third sequence of multiple master information blocks over the wireless broadcast channel.

* * * * *